US012614813B2

(12) United States Patent
Cheng et al.

(10) Patent No.: US 12,614,813 B2
(45) Date of Patent: Apr. 28, 2026

(54) SEPARATOR THICKNESS ADJUSTMENT DEVICE AND METHOD, AND WINDING ELECTRODE ASSEMBLY PRODUCTION SYSTEM

(71) Applicant: JIANGSU CONTEMPORARY AMPEREX TECHNOLOGY LIMITED, Changzhou (CN)

(72) Inventors: Peng Cheng, Changzhou (CN); Qi Zhang, Changzhou (CN); Yuanyuan Xie, Changzhou (CN); Yunlu Tang, Changzhou (CN); Baoming Feng, Changzhou (CN); Ke Wan, Changzhou (CN)

(73) Assignee: JIANGSU CONTEMPORARY AMPEREX TECHNOLOGY LIMITED, Changzhou (CN)

( * ) Notice: Subject to any disclaimer, the term of this patent is extended or adjusted under 35 U.S.C. 154(b) by 118 days.

(21) Appl. No.: 18/404,860

(22) Filed: Jan. 4, 2024

(65) Prior Publication Data

US 2024/0154246 A1 May 9, 2024

Related U.S. Application Data

(63) Continuation of application No. PCT/CN2022/085455, filed on Apr. 7, 2022.

(51) Int. Cl.
*H01M 50/403* (2021.01)

(52) U.S. Cl.
CPC ................................ *H01M 50/403* (2021.01)

(58) Field of Classification Search
CPC .................................................. H01M 50/403
See application file for complete search history.

(56) References Cited

U.S. PATENT DOCUMENTS

| | | | |
|---|---|---|---|
| 2001/0001557 A1 | 5/2001 | Suzuki | |
| 2022/0069276 A1* | 3/2022 | Lee | B32B 37/10 |
| 2024/0157420 A1* | 5/2024 | Wang | B21B 37/165 |

FOREIGN PATENT DOCUMENTS

| | | |
|---|---|---|
| CN | 2779625 Y | 5/2006 |
| CN | 102530617 A | 7/2012 |

(Continued)

OTHER PUBLICATIONS

The extended European search report received in the corresponding European Application 22936110.0, mailed on Jul. 3, 2024.

(Continued)

*Primary Examiner* — Nicholas Krasnow
(74) *Attorney, Agent, or Firm* — K&L Gates LLP

(57) ABSTRACT

Provided are a separator thickness adjustment device and method, and a winding electrode assembly production system. The separator thickness adjustment device includes: a mounting base; an active roller and a passive roller disposed at the mounting base in parallel to each other, in which each of the active roller and the passive roller is rotatable about its own axis, a gap is formed between the active roller and the passive roller, a separator passes through the gap, and a position of the passive roller relative to the active roller is adjustable to change a size of the gap; a first drive component configured to drive the active roller to rotate about its own axis to move the separator; and a second drive component configured to drive the passive roller to move towards or away from the active roller.

16 Claims, 6 Drawing Sheets

(56)     References Cited

FOREIGN PATENT DOCUMENTS

| CN | 102530617 | B | * | 1/2015 |
| CN | 106205873 | B | | 2/2018 |
| CN | 109494342 | A | | 3/2019 |
| CN | 109585902 | A | | 4/2019 |
| CN | 208812540 | U | | 5/2019 |
| CN | 209418678 | U | | 9/2019 |
| CN | 209822813 | U | | 12/2019 |
| CN | 210366266 | U | | 4/2020 |
| CN | 210576165 | U | | 5/2020 |

OTHER PUBLICATIONS

International Search Report received in the corresponding International Application PCT/CN2022/085455, mailed Dec. 22, 2022.
Written Opinion of ISA received in the corresponding International Application PCT/CN2022/085455, mailed Dec. 22, 2022.

* cited by examiner

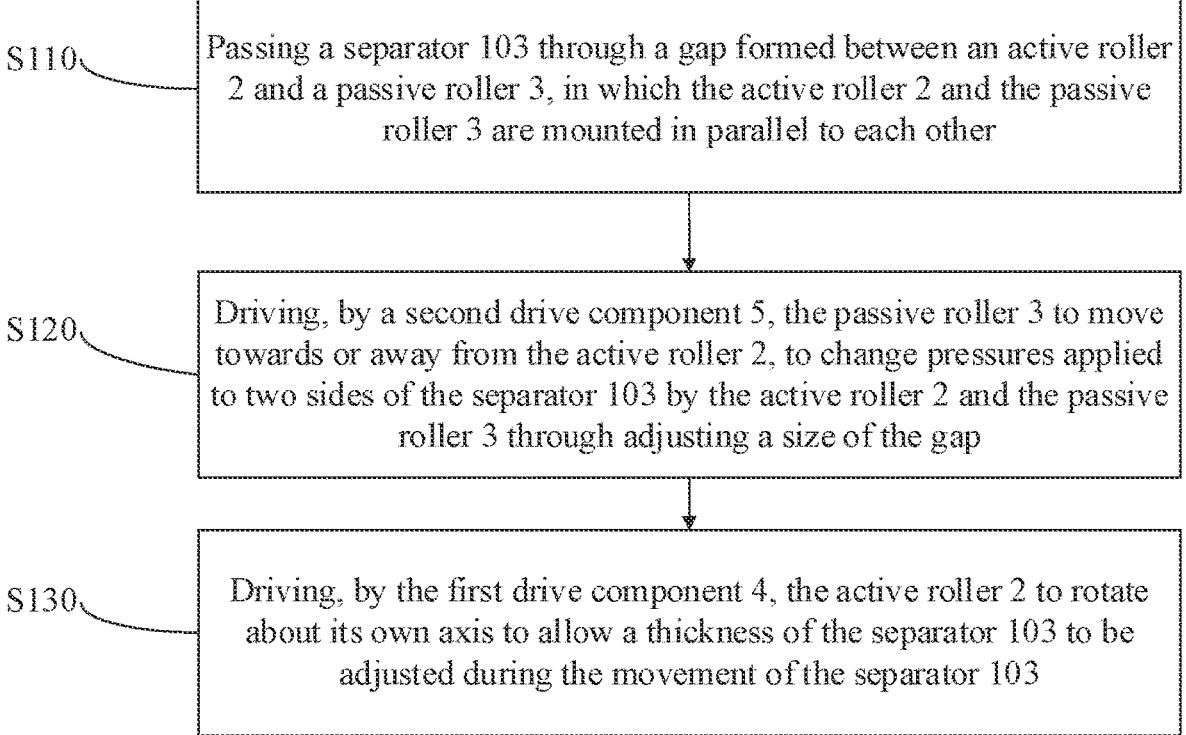

S110 — Passing a separator 103 through a gap formed between an active roller 2 and a passive roller 3, in which the active roller 2 and the passive roller 3 are mounted in parallel to each other S120 — Driving, by a second drive component 5, the passive roller 3 to move towards or away from the active roller 2, to change pressures applied to two sides of the separator 103 by the active roller 2 and the passive roller 3 through adjusting a size of the gap S130 — Driving, by the first drive component 4, the active roller 2 to rotate about its own axis to allow a thickness of the separator 103 to be adjusted during the movement of the separator 103

FIG. 13

SEPARATOR THICKNESS ADJUSTMENT DEVICE AND METHOD, AND WINDING ELECTRODE ASSEMBLY PRODUCTION SYSTEM

CROSS-REFERENCE TO RELATED APPLICATIONS

This application is a continuation of International Application PCT/CN2022/085455, filed Apr. 7, 2022 and entitled "SEPARATOR THICKNESS ADJUSTMENT DEVICE AND METHOD, AND WINDING ELECTRODE ASSEMBLY PRODUCTION SYSTEM", which is incorporated herein by reference in its entirety.

FIELD

The present disclosure relates to the field of battery production technologies, and more particularly, to a separator thickness adjustment device and method, and a winding electrode assembly production system.

BACKGROUND

Lithium ion batteries have been widely used in electric vehicles due to their high energy density, high power density, many cycles and long storage time.

A manufacturing process of the lithium battery includes electrode plate manufacturing, electrode assembly manufacturing, and battery assembly, etc. For the jell-roll electrode assembly, an alignment degree of wound tabs is one of the important indexes for measuring winding instructions. However, for the electrode assemblies with a large number of winding turns, it is still a difficult problem to ensure the alignment degree of the tabs due to the large offset of the tab.

SUMMARY

Embodiments of the present disclosure is to effectively control an alignment degree of tabs of a winding electrode assembly.

In one embodiment of the present disclosure, provided is a separator thickness adjustment device. The separator thickness adjustment device includes: a mounting base; an active roller and a passive roller disposed at the mounting base in parallel to each other, in which each of the active roller and the passive roller is rotatable about its own axis, a gap is formed between the active roller and the passive roller, a separator passes through the gap, and a position of the passive roller relative to the active roller is adjustable to change a size of the gap; a first drive component configured to drive the active roller to rotate about its own axis to move the separator; and a second drive component configured to drive the passive roller to move towards or away from the active roller, to change pressures applied to two sides of the separator by the active roller and the passive roller through adjusting the size of the gap, adjusting a thickness of the separator during the movement of the separator.

According to the embodiments of the present disclosure, the second drive component can drive the passive roller to move towards or away from the active roller to change the pressures applied to the two sides of the separator by the active roller and the passive roller through adjusting the size of the gap, thereby adjusting an overall thickness of the separator. Thus, during the winding to form the electrode assembly, the overall thickness of the separator can be adjusted based on an offset of the tab to reduce an offset of each of the tab portions of the tab, thereby improving alignment degree of each tab portion of the tab. Since a negative electrode plate may be subjected to expansion force during production, a thickness and size of the negative electrode plate may fluctuate, and a thickness and surface flatness of a positive electrode plate and the negative electrode plate after coated with an active substance and dried may also fluctuate. Further, a deviation may occur on a winding force applied to the electrode assembly during the winding. All of these may cause offset of the tab. By forming the separator with a constant thickness and then adjusting the thickness of the separator, it is possible to achieve an adjustment as required.

Further, the separator has good flexibility and ductility and a large adjustment range, and is thus not easy to be damaged or fractured during the thickness adjustment. As a result, the adjusted separator has a uniform thickness, which can ensure winding quality and yield of the electrode assembly. In addition, through driving the separator by the first drive component to operate, the thickness of the separator can be adjusted in an entire extending direction to adjust the thickness of the separator on-line during the winding of the electrode assembly. Thus, production efficiency of the electrode assembly can be improved.

In some embodiments, the separator thickness adjustment device further includes a distance detection component disposed at the mounting base and configured to detect a movement distance of the passive roller.

According to the embodiment, the movement distance of the passive roller is determined by the distance detection component, and thus a position of the passive roller can be accurately acquired to determine the size of the gap between the active roller and the passive roller, thereby obtaining the pressures applied to the separator by the active roller and the passive roller, which in turn ensures the thickness adjustment amount of the separator.

In some embodiments, the active roller and the passive roller are arranged directly opposite to each other on the two sides of the separator.

According to the embodiment, pressing forces are applied to the separator through the directly opposite arrangement of the active roller and the passive roller, and thus pressures can be applied perpendicularly on the surface of the separator to form positive pressures. As a result, more effort when thinning the separator can be saved, and the surface of the separator can be flatter to ensure uniform thickness.

In some embodiments, the separator thickness adjustment device further includes two guide components. The two guide components are disposed between two ends of the passive roller and the mounting base respectively, and configured to guide the movement of the passive roller.

According to the embodiment, by providing the guide components at two ends of the passive roller, the passive roller can move towards or away from the active roller in a predetermined direction. Thus, it is easily to determine correspondence between the movement amount of the passive roller and the gap between the passive roller and the active roller. Moreover, the passive roller can move more stably during the adjusting, thereby avoiding shaking to maintain the size of the gap after the adjusting. Thus, the accuracy of the thickness adjustment of the separator can be improved.

In some embodiments, the guide component includes a first guide disposed on the mounting base, and a second guide movably disposed relative to the first guide in an adjustment direction of the passive roller. An end of the passive roller is rotatably mounted to the second guide, and an output end of the second drive component is connected to the second guide.

According to the embodiment, by providing the first guide and the second guide that are movable relative to each other in the adjustment direction of the passive roller, the second drive component can drive the passive roller to move by driving the second guide. Thus, the structure is simple, and an automatic adjustment of the position of the passive roller can be realized by the second drive component, thereby achieving automatic adjustment of the thickness of the separator.

In some embodiments, the separator thickness adjustment device further includes a heating assembly configured to heat at least one of the active roller and the passive roller.

According to the embodiment, by providing the heating component to heat at least one of the active roller and the passive roller, the temperature of the separator can be increased during the applying of the pressures to the separator by the active roller and the passive roller. Thus, it is possible to thin the separator easily with the pressures and reduce the pressures applied by the active roller and the passive roller. As a result, dot-shaped particles distributed in a PCS layer can be flatted easily to thin the separator, thereby increasing the thickness adjustment range of the separator.

In some embodiments, the heating assembly includes a first heating component disposed within the active roller and configured to heat the active roller, and/or a second heating component disposed within the passive roller and configured to heat the passive roller.

According to the embodiment, the first heating component is disposed within the active roller, and the second heating component is disposed within the passive roller. Thus, a space for the separator to pass between the active roller and the passive roller is formed without an additional occupied external space. Further, heat generated by the heating can be conducted to surfaces of the active roller and the passive roller more quickly, thereby ensuring heating effect.

In some embodiments, the separator thickness adjustment device further includes a controller. The controller is configured to determine the adjustment amount of the passive roller and the heating temperature of the heating assembly based on an offset of an innermost-layer tab portion from an outermost-layer tab portion of the winding electrode assembly in a winding circumferential direction of the electrode assembly.

According to the embodiment, the adjustment amount of the passive roller and the heating temperature of the heating assembly can be quantitatively determined based on the offset of the tab in the winding circumferential direction of the electrode assembly. Thus, the alignment degree of the tab can be improved.

In some embodiments, the separator thickness adjustment device further includes a controller. The controller is configured to move the passive roller away from the active roller and reduce the heating temperature of the heating assembly when the outermost-layer tab portion is offset from the innermost-layer tab portion in the winding direction of the winding electrode assembly; and/or the controller is configured to move the passive roller towards the active roller and increase the heating temperature of the heating assembly, when the outermost-layer tab portion is offset from the innermost-layer tab portion in the an opposite direction to the winding direction of the winding electrode assembly.

According to the embodiment, the adjustment direction of the passive roller and a change trend of the heating temperature of the heating assembly can be determined based on the offset direction of the outermost-layer tab portion with the innermost-layer tab portion. Thus, the offset of the tab can be adjusted accordingly to align the tabs.

In some embodiments, the mounting base includes two fixing plates spaced apart from each other along the axis of the active roller, and a plurality of support rods connected between the two fixing plates. The active roller and the passive roller are located between two fixing plates. Two ends of the active roller are mounted to the two fixing plates, respectively. The first drive component is mounted on the fixing plate. Two second drive components are provided, and mounted to the two fixing plates, respectively. Two ends of the passive roller are operatively mounted to output ends of the two second drive components, respectively.

According to the embodiment, the mounting base has an assembled frame structure. Thus, the mounting base has simple structure and high strength and stability. Therefore, it is possible to facilitate the mounting of various structural members and provide the space for the separator to pass therethrough.

In one embodiment of the present disclosure, provided is a winding electrode assembly production system. The winding electrode assembly production system includes an unwinding device configured to unwind a separator of a winding form; a winding device configured to wind a first electrode plate, a second electrode plate, and the separator to form an electrode assembly, in which the first electrode plate has an opposite polarity to the second electrode plate; and the separator thickness adjustment device as described in the above embodiments, in which the separator thickness adjustment device is disposed between the unwinding device and the winding device and configured to adjust a thickness of the separator unwound from the unwinding device.

In one embodiment of the present disclosure, provided is a separator thickness adjusting method including: passing a separator through a gap formed between an active roller and a passive roller, in which the active roller and the passive roller are mounted in parallel to each other; driving, by a second drive component, the passive roller to move towards or away from the active roller, to change pressures applied to two sides of the separator by the active roller and the passive roller through adjusting a size of the gap; and driving, by the first drive component, the active roller to rotate about its own axis to allow a thickness of the separator to be adjusted during the movement of the separator.

In some embodiments, the separator thickness adjusting method further includes: heating at least one of the active roller and passive roller by means of a heating assembly during the applying of the pressures to the two sides of the separator by the active roller and the passive roller.

In some embodiments, the separator thickness adjusting method further includes: determining an adjustment amount of the passive roller and a heating temperature of the heating assembly based on an offset of an innermost-layer tab portion from an outermost-layer tab portion of a winding electrode assembly in a winding circumferential direction of the winding electrode assembly.

In some embodiments, determining the adjustment amount of the passive roller and the heating temperature of the heating assembly based on the offset of the innermost-layer tab portion from the outermost-layer tab portion of the winding electrode assembly in the winding circumferential direction of the winding electrode assembly includes: moving the passive roller away from the active roller and reducing the heating temperature of the heating assembly, when the outermost-layer tab portion is offset from the innermost-layer tab portion in a winding direction of the winding electrode assembly; and/or moving the passive roller towards the active roller and increasing the heating temperature of the heating assembly, when the outermost-layer tab portion is offset from the innermost-layer tab portion in an opposite direction to the winding direction of the winding electrode assembly.

BRIEF DESCRIPTION OF DRAWINGS

In order to explain the technical solutions of the embodiments of the present disclosure more clearly, the following will briefly introduce the drawings which need to be used in the embodiments of the present disclosure; obviously, the drawings described below are only some embodiments of the present disclosure, and it would have been obvious for a person of ordinary skill in the art to obtain other drawings according to the drawings without involving any inventive effort.

FIG. 13 is a flowchart of some embodiments of a separator thickness adjusting method of the present disclosure.

DESCRIPTION OF EMBODIMENTS

Figures 1, 2:
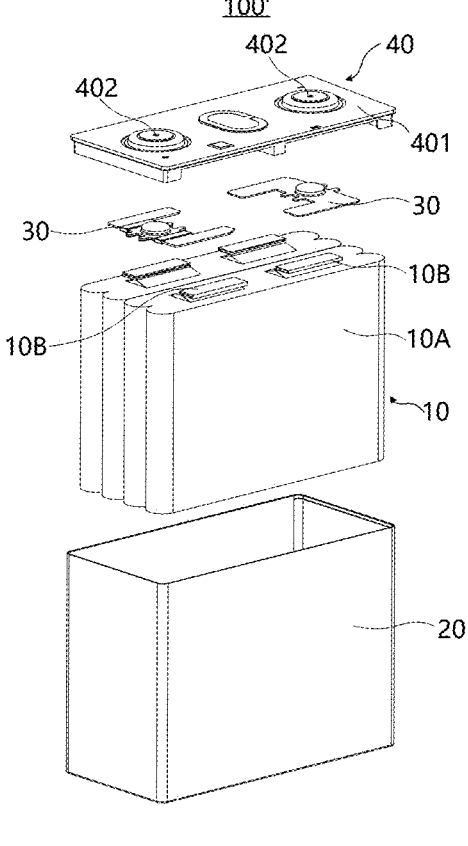
FIG. 1 is a schematic structural view of some embodiments of a battery cell.
FIG. 2 is a schematic structural view of end surfaces of some embodiments of a winding electrode assembly in a battery cell.

Implementations of the present disclosure are described in further detail below with reference to the accompanying drawings and embodiments. The following detailed description of the embodiments and the accompanying drawings are provided to illustrate the principles of the present disclosure and are not intended to limit the scope of the present disclosure, i.e., the present disclosure is not limited to the embodiments described.

In the description of the embodiments of the present disclosure, the term "plurality" refers to two or more (including two), and similarly, "groups" refers to two or more (including two) groups, and "pieces" refers to two or more (including two) pieces.

The present disclosure uses descriptions of orientations or positional relationships indicated by "upper", "lower", "top", "bottom", "front", "back", "inner", and "outer" and the like, for ease of description of the present disclosure only, and does not indicate or imply that the device referred to must have a particular orientation, be constructed and operated in a particular orientation, and therefore should not be construed to limit the scope of the present disclosure.

Furthermore, the terms "first", "second", "third", and the like are used for descriptive purposes only and are not to be construed as indicating or implying relative importance. "Vertical" is not vertical in the strict sense, but within the tolerance. "Parallel" is not parallel in the strict sense, but within the tolerance. The orientation words appearing in the following description are directions shown in the drawings and do not limit the specific structure of the present disclosure.

In the description of the present disclosure, it should also be noted that, unless expressly specified and limited otherwise, the terms "mounted", "linked", and "connected" are to be interpreted broadly, e.g., either fixedly or detachably, or integrally connected; may be directly linked or indirectly linked through an intermediary. For a person of ordinary skill in the art, the specific meaning of the above-mentioned terms in the present disclosure can be understood on a housing-by-housing basis.

Reference herein to "embodiment" means that a particular feature, structure, or characteristic described in connection with the embodiment may be included in at least some embodiments of the present disclosure. The appearances of the phrase in various places in the specification are not necessarily all referring to the same embodiment, nor are separate or alternative embodiments mutually exclusive of other embodiments. It is to be expressly and implicitly understood by one of ordinary skill in the art that the embodiments described herein may be combined with other embodiments.

The battery as described in the embodiments of the present disclosure refers to a single physical module including a plurality of battery cells to provide higher voltage and capacity. For example, the battery as described in the present disclosure may include a battery module or a battery pack, etc.

The battery cell may include a lithium ion battery, a lithium sulphur battery, a sodium lithium ion battery, a sodium ion battery, or a magnesium ion battery, etc., and the embodiments of the present disclosure are not limited thereto. The battery cell may have be cylindrical, flat, rectangular, or other shapes, and the embodiments of the present disclosure are not limited thereto. The battery cells are generally divided into three types based on a packaged manner, including a cylindrical battery cell, a square battery cell, and a soft pack battery cell, and the embodiments of the present disclosure are not limited thereto.

An existing battery cell generally includes a housing and an electrode assembly accommodated in the housing. An electrolyte is filled in the housing. The electrode assembly is mainly formed by stacking or winding the first electrode plate and the second electrode plate that have opposite polarities, and an insulation member such as a separator is generally disposed between the first electrode plate and the second electrode plate. Parts, which are coated with an active substance, of the first electrode plate and the second electrode plate are formed into a body portion of the electrode assembly, and parts, which are not coated with the active substance, of the first electrode plate and the second electrode plate are formed into a first tab and a second tab, respectively. In a lithium ion battery, the first electrode plate may be a positive electrode plate including a positive electrode current collector and positive electrode active substance layers provided on two sides of the positive electrode current collector. For example, the positive electrode current collector may be made of aluminum, and the positive electrode active substance may be lithium cobaltate, lithium iron phosphate, ternary lithium or lithium manganite. The second electrode plate may be a negative electrode plate including a negative electrode current collector and negative electrode active substance layers provided on two sides of the negative electrode current collector. For example, the negative electrode current collector may be made of copper, and the negative electrode active substance may be graphite or silicon, etc. In some embodiments, the first electrode plate may also be a negative electrode plate, and correspondingly the second electrode plate may be a positive electrode plate. The first tab and the second tab may be co-located at an end of the body portion, or separately located at two ends of the body portion. During charging and discharging of the battery cell, the positive electrode active substance and the negative electrode active substance react with an electrolytic solution, and the tab is connected to a terminal to form a current loop.

In order to more clearly explain the improved idea of the present disclosure, a battery cell and an electrode assembly therein are described in detail below.

In some embodiments, as shown in FIG. 1, a battery cell 100' includes a housing 20, an electrode assembly 10, an end cap assembly 40, and two adapters 30. The housing 20 has an opening. The end cap assembly 40 closes the opening and is connected to the housing 20 to form a casing of the battery cell 100. The electrode assembly 10 is disposed within the housing 20, and the housing 20 is filled with an electrolytic solution. One or more electrode assemblies 10 may be provided as desired.

FIG. 2 is a schematic structural view of an end portion of a winding electrode assembly. The electrode assembly 10 is formed by winding a first electrode plate 101 and a second electrode plate 102 that having opposite polarities, and a separator 103 is generally disposed between the first electrode plate 101 and the second electrode plate 102. For example, the electrode assembly 10 is of a flat shape with two opposite parallel straight sections 10A and two opposite bending sections 10B. The two bending sections 10B are connected to the same ends of the two straight sections 10A. In some embodiments, the electrode assembly 10 may be of a cylindrical shape.

Figure 3:
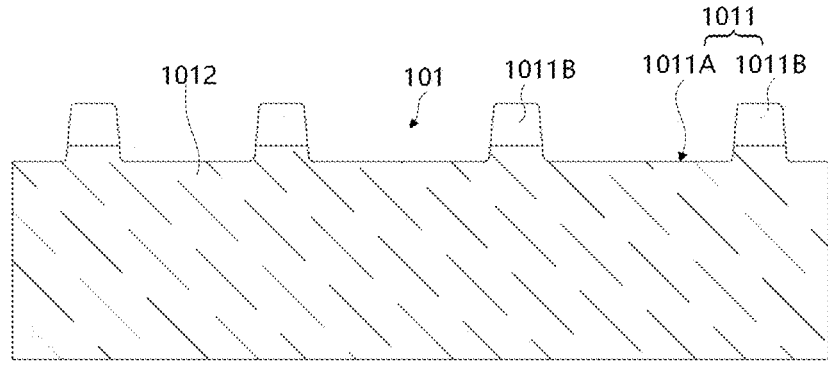
FIG. 3 is a schematic structural view of some embodiments of a first electrode plate.
Figure 4:
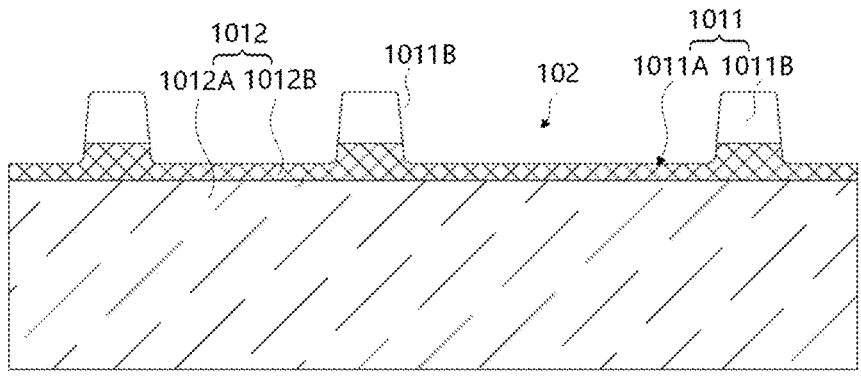
FIG. 4 is a schematic structural view of some embodiments of a second electrode plate.

As shown in FIGS. 3 and 4, each of the first electrode plate 101 and the second electrode plate 102 includes a current collector 1011. The current collector 1011 may include a body portion 1011A and a tab portion 1011B protruding outwards from an end surface of the body portion 1011A in a width direction of the body portion 1011A. A side surface of the current collector 1011 is provided with a coating layer 1012, and the coating layer 1012 may be provided on two sides of the current collector 1011. In addition, for an innermost electrode plate or an outermost electrode plate, the coating layer 1012 may be provided only on one side of the current collector 1011.

FIG. 3 is a schematic structural view of some embodiments of a first electrode plate 101. For example, the first electrode plate 101 is a negative electrode plate. The current collector 1011 may be made of copper, and the coating layer 1012 may be made of a negative electrode active substance such as graphite or silicon. A coating region of the coating layer 1012 in the width direction of the first electrode plate 101 extends beyond an edge of the body portion 1011A to cover a bottom portion of the tab portion 1011B.

FIG. 4 is a schematic structural view of the second electrode plate 102. For example, the second electrode plate 102 is a positive electrode plate. The current collector 1011 may be made of aluminum. The coating layer 1012 may include an active substance layer 1012A and an insulation layer 1012B that are arranged side by side in a width direction of the second electrode plate 102. The insulation layer 1012B is located at a side of the active substance layer 1012A close to the tab portion 1011B in the width direction of the second electrode plate 102. The active substance layer 1012A may be made of lithium cobaltate, lithium iron phosphate, ternary lithium, lithium manganite, or the like. By providing the insulation layer 1012B and enabling the body portion 1011A of the negative electrode plate to be located in a region where the insulation layer 1012B is located close to the end portion of the tab portion 1011B in the width direction, a risk of short-circuiting of the first electrode plate 101 and the second electrode plate 102 due to penetrating of the separator 103 by metal filings can be reduced while ensuring that the active substance layer 1012A of the negative electrode exceeds the active substance layer 1012A of the positive electrode adjacent to the negative electrode in the width direction.

Figure 5:
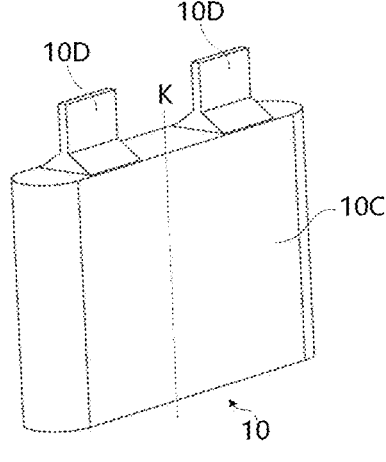
FIG. 5 is a perspective view of some embodiments of a winding electrode assembly.

FIG. 5 is a schematic structural view in which the first electrode plate 101, the second electrode plate 102, and the separator 103 are wound in a winding axis K to form the electrode assembly 10. The body portion 1011A of each of the first electrode plate 101 and the second electrode plate 102 is wound to form an electrode body 10C. A plurality of tab portions 1011B of the first electrode plate 101 are stacked to form a tab 10D, and a plurality of tab portions 1011B of the second electrode plate 102 are stacked to form a tab 10D. These two tabs 10D may extend from the same end of the electrode body 10C along the winding axis K. In some embodiments, the tabs 10D extends from two end of the electrode body 10C along the winding axis K, respectively.

In an example, a plurality of tab portions 1011B of the tab 10D should be perfectly aligned with each other in the winding direction. That is, all of the tab portions 1011B of the first tab 10D are arranged directly opposite to each other.

Winding is an important part during production of the electrode assembly 10, and an alignment degree of the tabs 10D (i.e., an alignment degree of the plurality of tab portions 1011B of the tab 10D) is one of important indexes for measuring winding quality. For an electrode assembly 10 having a large number of winding turns, offset control on the plurality of tab portions 1011B of the tab 10D is difficult during the winding.

Figure 6:
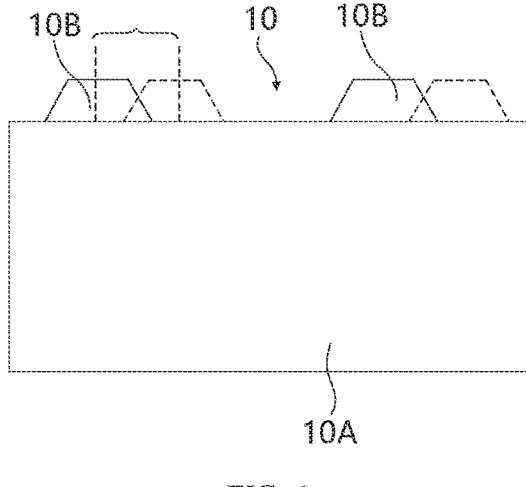
FIG. 6 is a front view of some embodiments of a winding electrode assembly.

It has been found in practice that thickness deviations and surface irregularities of the first electrode plate 101 and the second electrode plate 102, a degree of tightness of the winding, and the like have significant influence on the alignment degree of the tabs 10D, and are difficult to be controlled during the winding. As shown in FIG. 6, an offset of the tab 10B is ΔX, i.e., the offset of the innermost-layer tab portion 1011B from the outermost-layer tab portion 1011B in the same tab 10B.

In this case, it has been found that compensation for the influence of dimension error and winding tightness on the alignment degree of the tab 10D may be realized by adjusting a thickness of the electrode plate itself. For example, the thickness of the electrode plate may be adjusted by applying pressure by a roller. In this way, although the offset of the tab 10D can be improved to some extent, the effect is not ideal, and there is a predetermined deviation of the alignment degree of the tab 10D.

In addition, due to large brittleness of the electrode plate in some batteries and the limited regulation of the thickness of the electrode plate, the amount of error correction required for the offset of the tab 10D cannot be achieved, and the applying of the pressures by the rollers would cause the active substance on the electrode plate to peel off, resulting in a risk of lithium precipitation. Moreover, some ternary system products (such as including nickel, cobalt, and manganese) have high energy density, which will increase a lithium ion transmission distance and lead to lithium precipitation, thereby posing a safety risk. In addition, due to safety risk management and control, since some products cannot be mounted with rollers that apply a pressure to the electrode plates, the offset of the tab 10D cab bit be effectively controlled.

In view of the above, it has been found that the brittleness of the separator 103 is smaller than that of the electrode plate, and has better flexibility and ductility. Therefore, it is possible to try to improve the offset of the tab 10D by adjusting the thickness of the separator. In accordance with this improvement idea, embodiments of the present disclosure provide a separator thickness adjustment device.

Figure 7:
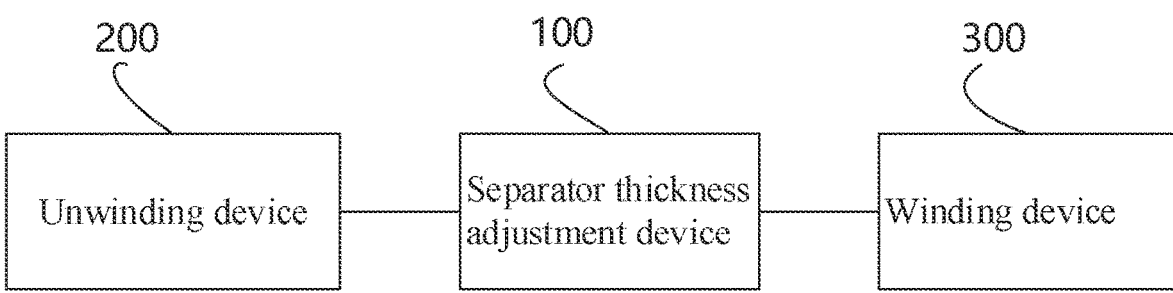
FIG. 7 is a schematic module composition diagram of some embodiments of a winding electrode assembly production system.

As shown in FIG. 7, such a separator adjustment device 100 may be applied in a winding electrode assembly production system. The winding electrode assembly production system includes an unwinding device 200, a separator thickness adjustment device 100, and a winding device 300. The unwinding device 200 is configured to unwind the separator 103 of a winding form. The winding device 300 is configured to wind the first electrode plate 101, the second electrode plate 102, and the separator 103 to form an electrode assembly 10. The first electrode plate 101 has an opposite polarity to the second electrode plate 102. The separator thickness adjustment device 100 is disposed between the unwinding device 200 and the winding device 300, and is configured to adjust a thickness of the separator 103 unwound from the unwinding device 200.

Figure 8:
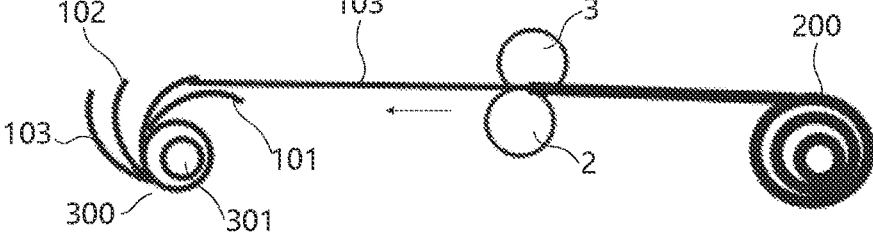
FIG. 8 is a schematic diagram showing the principle in which a separator thickness is adjusted by a separator thickness adjustment device of the present disclosure.

As shown in FIG. 8, the separator 103 unwound from the unwinding device 200 enters the winding device 300 after passing through the separator thickness adjustment device 100, and is wound onto a spool 301 with a predetermined tension after the first electrode plate 101, the second electrode plate 102, and the two separators 103 are received by the winding device 300. Based on requirements for adjusting the offset of the tab 10D, when the adjustment amount is small, the separator adjustment device 100 may be provided for only one of the unwinding devices 200, and the thickness may be adjusted for only one separator 103. In some embodiments, when the adjustment amount is large, two separator adjustment device 100 are correspondingly provide for two unwinding devices 200 to selectively adjust the thicknesses of the two separators 103. In this way, it is possible to increase an adjustment range, or reduce the adjustment amount of each separator adjustment device 100 without changing the adjustment range.

During the winding of the electrode assembly 10, the separator 103 moves at a predetermined speed, and such a movement is driven by the separator adjustment device 100 or the winding device 300. Through the movement of the separator 103, the thickness of the separator 103 in the entire extension direction can be adjusted.

In some embodiments, in order to further increase the offset adjustment range of the tab 10D, an electrode plate thickness adjustment device may also be added to at least one of the first electrode plate 101 and the second electrode plate 102, and the electrode plate thickness adjustment device has the same structure as the separator adjustment device 100.

According to the embodiment, during the winding to form the electrode assembly 10, an overall thickness of the separator 103 may be adjusted based on the offset of the tab 10D to reduce the offset of the respective tab portions 1011B of the tab 10D, thereby improving the alignment degree of the respective tab portions 1011B of the tab 10D. Further, the separator 103 has good flexibility and ductility, and a large adjustment range, and thus is not easy to be damaged or fractured during the thickness adjustment. As a result, the adjusted separator has a uniform thickness, and can ensure winding quality and yield of the electrode assembly 10. In addition, in this manner, the thickness of the separator 103 can be adjusted on-line during the winding of the electrode assembly 10, and thus production efficiency of the electrode assembly 10 can be improved.

Figure 9:
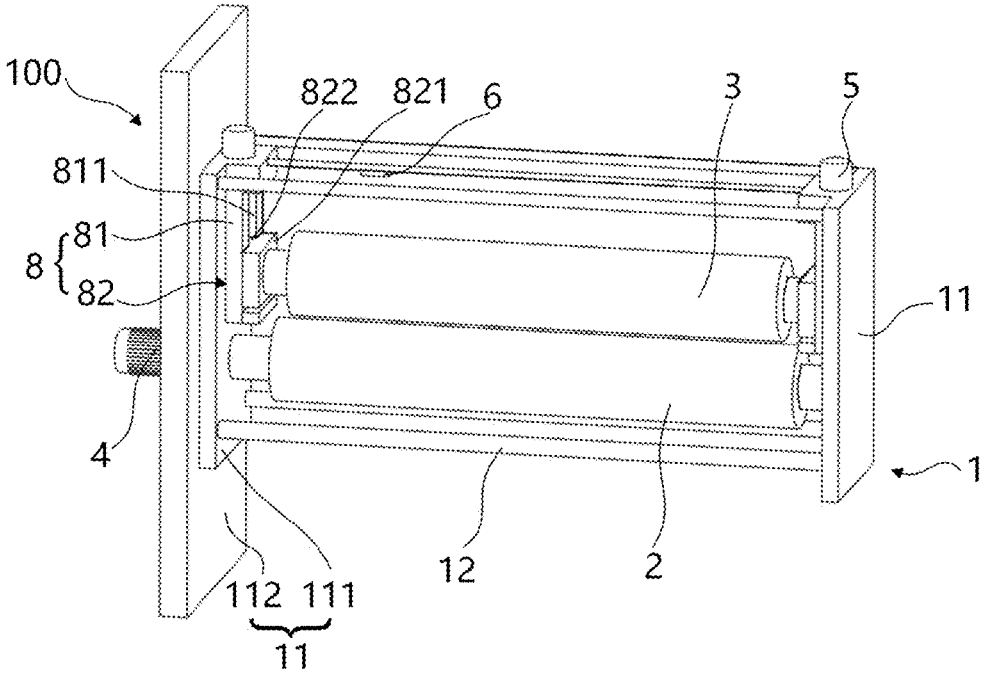
FIG. 9 is a perspective view of some embodiments of a separator thickness adjustment device of the present disclosure.
Figure 10:
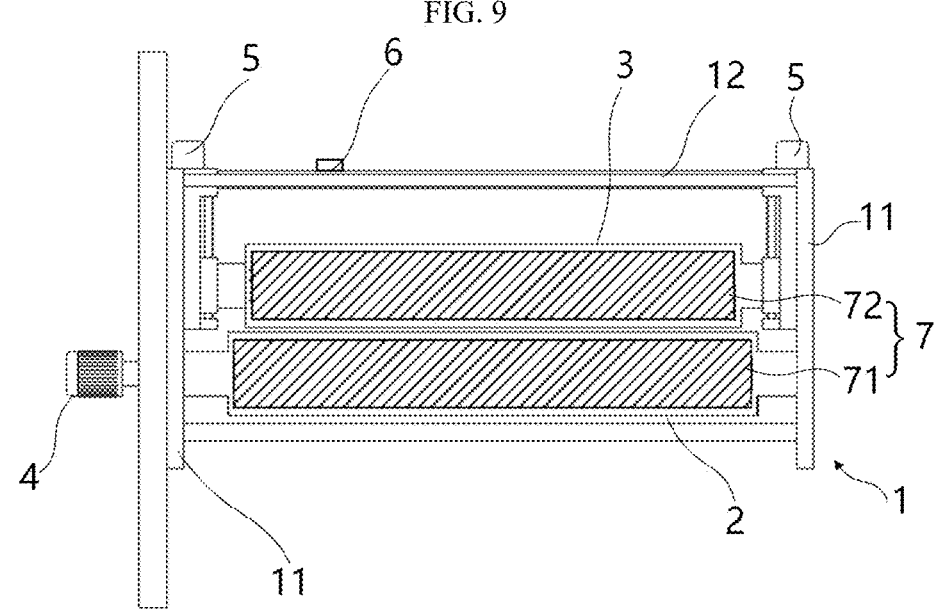
FIG. 10 is a front view of some embodiments of a separator thickness adjustment device of the present disclosure.
Figure 11:
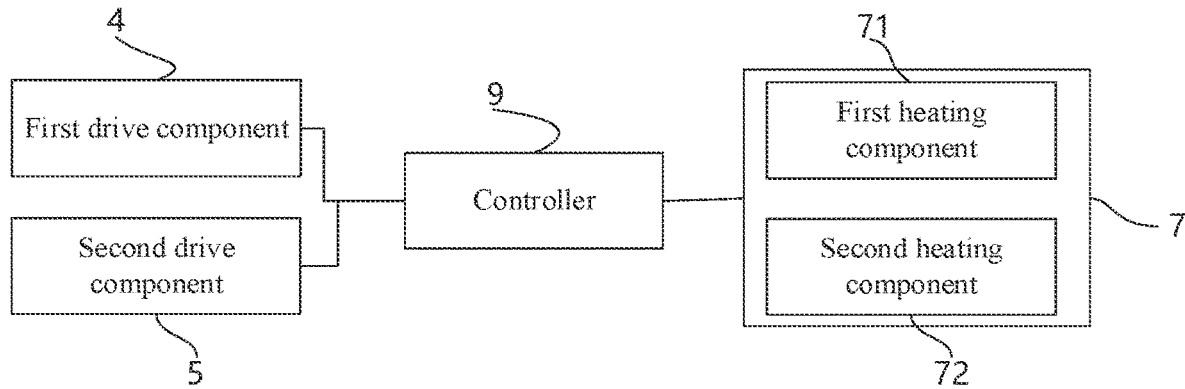
FIG. 11 is a schematic module composition diagram of some embodiments of a separator thickness adjustment device of the present disclosure.

In some embodiments, as shown in FIGS. 9 to 11, a separator thickness adjustment device 100 includes a mounting base 1, an active roller 2, a passive roller 3, a first drive component 4, and a second drive component 5. Each of the active roller 2 and the passive roller 3 is rotatable about its own axis. The active roller 2 and the passive roller 3 are disposed on the mounting base 1 in parallel to each other. A gap is formed between the active roller 2 and the passive roller 3, and the separator 103 passes through the gap. A position of the passive roller 3 relative to the active roller 2 is adjustable to change size of the gap. The first drive component 4 is configured to drive the active roller 2 to rotate about its own axis to move the separator 103. The second drive component 5 is configured to drive the passive roller 3 to move towards or away from the active roller 2 to change pressures applied to two sides of the separator 103 by the active roller 2 and the passive roller 3 through adjusting a size of the gap, thereby adjusting a thickness during the movement of the separator 103.

The mounting base 1 may have a frame structure for mounting the active roller 2 and the passive roller 3 and facilitating passing of the separator 103. The active roller 2 and the passive roller 3 may have a cylindrical structure with their axes parallel. After the separator 103 passes through the gap, two side surfaces of the separator 103 in a thickness direction thereof are brought into contact with the active roller 2 and the passive roller 3, respectively. The first drive component 4 is configured to drive the active roller 2 to rotate about its own axis to drive the separator 103 to move. The movement of the separator 103 can further drive the passive roller 3 to move.

In some embodiments, the first drive component 4 may be mounted to the mounting base 1. The first drive component 4 may output a rotational motion, and an output end of the first drive component 4 is connected to an end of the active roller 2. For example, the first drive component 4 may include an electric motor, a motor or the like. In order to operate the separator 103 at a suitable speed to adapt the winding speed, the first drive component 4 may further include a speed reducer to change an output rotational speed of the electric motor or the motor to rotate the active roller 2 at a predetermined rotational speed.

The second drive component 5 is configured to drive the passive roller 3 to move. The passive roller 3 may be driven to move towards or away from the active roller 2 to change the pressures applied to two sides of the separator 103 by the active roller 2 and the passive roller 3 through adjusting the size of the gap, thereby adjusting the thickness of the separator 103. In some embodiments, the second drive component 5 may also be mounted to the mounting base 1. The second drive component 5 may output a linear motion. In order to maintain a constant gap in an entire length direction during the movement of the passive roller 3, two second drive components 5 may be provided for driving two ends of the passive roller 2, respectively, to allow for a constant thickness of the adjusted separator 103 in the width direction. For example, the second drive component 5 may be an electric push rod, a linear motor, an air cylinder, an oil cylinder, or the like. The electric push rod and the linear motor may achieve servo control, have a high control accuracy, and can be adapted to the requirement of fine and high-precision adjusting of the thickness of the separator 3.

In some embodiments, the separator 103 is formed by stacking a layered structure including a base film, two CCS (Ceramics coated separator) layers and a PCS (PVDF (Poly Vinylidene Fluoride) coated separator) layer. The two CCS layers are provided on two sides of the base film, respectively, and the PCS layer is provided on an outer side of each of the CCS layers. The PCS layer may be provided on the outer side of each of the two CCS layers, or on the outer side of one of the two CCS layers. There are many particles distributed in a dotted shape in the PCS layer. During the applying of the pressures to the separator 103, the particles are flattened to thin the PCS layer, thereby adjusting the thickness of the separator 103.

According to the embodiment, the second drive component 5 can drive the passive roller 3 to move towards or away from the active roller 2 to change the pressures applied to the two sides of the separator 103 by the active roller 2 and the passive roller 3 through adjusting the size of the gap, thereby adjusting the overall thickness of the separator 103. Thus, during the winding to form the electrode assembly 10, the overall thickness of the separator 103 can be adjusted based on the offset of the tab 10D, to reduce the offset of each of the tab portions 1011B of the tab 10D. Thus, it is possible to improve the alignment degree of each tab portion 1011B of the tab 10D. Since the negative electrode plate may be subjected to expansion force during the production, the thickness and size of the negative electrode plate may fluctuate, and the thickness and surface flatness of the positive electrode plate and the negative electrode plate after coated with the active substance and dried may also fluctuate. Further, a deviation may occur on a winding force applied to the electrode assembly 10 during the winding. All of these may cause the offset of the tab 10D. By forming the separator 103 with a constant thickness and then adjusting the thickness of the separator 103, it is possible to achieve the adjustment as required.

Further, the separator 103 has good flexibility and ductility and a large adjustment range, and is thus not easy to be damaged or fractured during the thickness adjustment. As a result, the adjusted separator has a uniform thickness, which can ensure the winding quality and yield of the electrode assembly 10. In addition, through driving the separator 103 by the first drive component 4 to operate, the thickness of the separator 103 can be adjusted in the entire extending direction to adjust the thickness of the separator 103 on-line during the winding of the electrode assembly 10. Thus, the production efficiency of the electrode assembly 10 can be improved.

In some embodiments, the separator thickness adjustment device 100 may further include a distance detection component 6. The distance detection component 6 is disposed at the mounting base 1 and configured to detect a movement distance of the passive roller 3.

For example, the distance detection component 6 may be an optical distance sensor, an infrared distance sensor, an ultrasonic distance sensor, or the like. The distance detection component 6 can determine the movement distance of the passive roller 3 by detecting a distance of the distance detection component 6 from a surface of the passive roller 3. For example, the distance detection component 6 may be provided on a movement path of the passive roller 3 to obtain a pressure between the active roller 2 and the passive roller 3 more simply and accurately.

According to the embodiment, the movement distance of the passive roller 3 is determined by the distance detection component 6, and thus the position of the passive roller 3 can be accurately acquired to determine the size of the gap between the active roller 2 and the passive roller 3, thereby obtaining the pressures applied to the separator 103 by the active roller 2 and the passive roller 3, which in turn ensures the thickness adjustment amount of the separator 103.

In some embodiments, the active roller 2 and the passive roller 3 are arranged directly opposite to each other on the two sides of the separator 103.

The phrase "arranged directly opposite to each other" means that the active roller 2 and the passive roller 3 are directly opposite to each other in the thickness direction of the separator 103. That is, a plane formed by the respective axes of the active roller 2 and the passive roller 3 is parallel to the thickness direction of the separator 103.

According to the embodiment, pressing forces are applied to the separator 103 through the directly opposite arrangement of the active roller 2 and the passive roller 3, and thus the pressures can be applied perpendicularly on the surface of the separator 103 to form positive pressure. As a result, more effort when thinning the separator 103 can be saved, and the surface of the separator 103 can be flatter to ensure uniform thickness.

In some embodiments, as shown in FIG. 9, the separator thickness adjustment device 100 may further include two guide components 8. The two guide components 8 are disposed between two ends of the passive roller 3 and the mounting base 1 respectively, and are configured to guide the movement of the passive roller 3.

According to the embodiment, by providing the guide components 8 at two ends of the passive roller 3, the passive roller 3 can move towards or away from the active roller 3 in a predetermined direction. Thus, it is easily to determine correspondence between the movement amount of the passive roller 3 and the gap between the passive roller 3 and the active roller 2. Moreover, the passive roller 3 can move more stably during the adjusting, thereby avoiding shaking to maintain the size of the gap after the adjusting. Thus, the accuracy of the thickness adjustment of the separator 103 can be improved.

In some embodiments, as shown in FIG. 9, each of the guide components 8 includes a first guide 81 disposed on the mounting base 1, and a second guide 82 movably disposed relative to the first guide 81 in an adjustment direction of the passive roller 3. An end of the passive roller 3 is rotatably mounted to the second guide 82, and an output end of the second drive component 5 is connected to the second guide 82.

For example, a guide groove 811 is formed on the first guide 81. The guide groove 811 extends in the adjustment direction of the passive roller 3. The second guide 82 includes a base plate 821 and a bump 822. The bump 822 is connected to the base plate 821. Further, the bump 822 is embedded in the guide groove 811 and is movable along the guide groove 811. The base plate 821 is supported on the first guide 81. The end of the passive roller 3 is connected to the bump 822. The passive roller 3 is rotatably connected relative to the bump 822. For example, the end of the passive roller 3 is rotatably mounted to the bump 822 by means of a bearing. In an example, the passive roller 3 includes a shaft and a sleeve. An end of the shaft is fixedly mounted to the bump 822, and the sleeve is rotatably sleeved over the shaft. In some embodiments, the first guide 81 has an inverse structure to the second guide 82.

According to the embodiment, by providing the first guide 81 and the second guide 82 that are movable relative to each other in the adjustment direction of the passive roller 3, the second drive component 5 can drive the passive roller 3 to move by driving the second guide 82. Thus, the structure is simple, and automatic adjustment of the position of the passive roller 3 can be realized by the second drive component 5, thereby achieving an automatic adjustment of the thickness of the separator 103.

In some embodiments, the separator thickness adjustment device 100 may further include a heating assembly 7 configured to heat at least one of the active roller 2 and the passive roller 3.

For example, both the active roller 2 and the passive roller 3 may be heated by the heating assembly 7, or the heating assembly 7 may include two separate heating components to separately heat the active roller 2 and the passive roller 3, which facilitates the adjusting of the heating temperature of the active roller 2 and the passive roller 3 as desired. For example, the heating assembly 7 may be an electromagnetic heating element, an electric heating wire heating element, an infrared heating element. In an example, the heating assembly 7 may also be a liquid conduit disposed in the active roller 2 and the passive roller 3 for introducing a gas or liquid medium with a relatively high temperature for heating.

According to the embodiment, by providing the heating component 7 to heat at least one of the active roller 2 and the passive roller 3, the temperature of the separator 103 can be increased during the applying of the pressures to the separator 103 by the active roller 2 and the passive roller 3. Thus, it is possible to thin the separator 103 easily with the pressures and reduce the pressures applied by the active roller 2 and the passive roller 3. As a result, the dot-shaped particles distributed in the PCS layer can be flatted easily to thin the separator 103, thereby increasing the thickness adjustment range of the separator 103.

In some embodiments, as shown in FIG. 10, the heating assembly 7 includes a first heating component 71 and/or a second heating component 72. The first heating component 71 is disposed within the active roller 2 and configured to heat the active roller 2. The second heating component 72 is disposed within the passive roller 3 and configured to heat the passive roller 3.

The first heating component 71 may be disposed in an entire length direction of the active roller 2, and the second heating component 72 may also be disposed in an entire length direction of the passive roller 3. Thus, it is possible for the active roller 2 and the passive roller 3 to be heated uniformly in the entire length direction, thereby heating the separator 103 uniformly in the entire width direction. Therefore, uniformity of thickness adjusting of the separator 103 can be improved.

In some embodiments, the heating temperatures of the first heating component 71 and the second heating component 71 may be linkage-controlled to allow the active roller 2 and the passive roller 3 to reach the same temperature. As a result, the pressures applied to the two sides of the separator 103 is uniform, and it is thus possible to prevent the separator 103 from being deformed during the heating. Therefore, it is suitable for a separator 103 have a PCS layer proved with both CCS layers on outer sides thereof. Or, the heating temperatures of the first heating component 71 and the second heating component 71 may be independently controlled. For example, the two heating components may be set to different temperatures, or only one heating component may be turned on. Therefore, it is suitable for a separator 103 having a PCS layer provide with only one CCS layer on an outer side thereof.

According to the embodiment, the first heating component 71 is disposed within the active roller 2, and the second heating component 72 is disposed within the passive roller 3. Thus, a space for the separator 103 to pass between the active roller 2 and the passive roller 3 is formed without additional occupied external space. Further, heat generated by the heating can be conducted to the surfaces of the active roller 2 and the passive roller 3 more quickly, thereby ensuring heating effect.

In some embodiments, as shown in FIG. 11, the separator thickness adjustment device 100 may further include a controller 9. The controller 9 is configured to determine the adjustment amount of the passive roller 3 and the heating temperature of the heating assembly 7 based on an offset of an innermost-layer tab portion 1011B from an outermost-layer tab portion 1011B of the winding electrode assembly 10 in a winding circumferential direction of the electrode assembly 10.

The offset $\Delta X$ may be measured from the wound electrode assembly 10. The offset $\Delta X$ includes an offset direction and an offset size of the outermost-layer tab portion 1011B from the innermost-layer tab portion 1011B in the winding circumferential direction. Based on correspondence between the offset $\Delta X$ and a thinned thickness $\Delta t$ of the separator 103, the thinned thickness $\Delta t$ of the separator 103 from an initial thickness can be obtained. Further, based on the thinned thickness $\Delta t$, the adjustment amount $\Delta s$ of the movement of the passive roller 3 towards the active roller 2 and the temperature T of the active roller 2 and/or the passive roller 3 to be heated can be obtained. Correspondence between the thinned thickness $\Delta t$, the adjustment amount $\Delta s$, and the temperature T may be experimentally pre-obtained.

In some embodiments, before the winding, after the adjustment amount of the passive roller 3 and the heating temperature of the heating assembly 7 is determined based on the offset $\Delta X$, the passive roller 3 is adjusted to a desired position, and after heated to a desired temperature T, the active roller 2 and/or the passive roller 3 are kept unchanged, and then the winding is performed. In this way, the separator 103 can be adjusted to the same thickness throughout the winding.

In some embodiments, during the winding, the offset between the wound tab portions 1011B may be measured on-line. For example, the offset is determined every N turns of winding, and the adjustment amount of the passive roller 3 and the heating temperature of the heating assembly 7 can be adjusted in real time based on the offset detected on-line, to adjust the thickness of the separator 103 based on actual winding requirements. Therefore, the alignment degree of the tab 10D can be further improved.

According to the embodiment, the adjustment amount of the passive roller 3 and the heating temperature of the heating assembly 7 can be quantitatively determined based on the offset of the tab 10D in the winding circumferential direction of the electrode assembly 10. Thus, the alignment degree of the tab 10D can be improved. In addition, the passive roller 3 and the heating assembly 7 can be adjusted automatically by the controller 9.

In some embodiments, as shown in FIG. 11, the separator thickness adjustment device 100 may further include a controller 9. The controller 9 is configured to move the passive roller 3 away from the active roller 2 and reduce the heating temperature of the heating assembly 7, when the outermost-layer tab portion 1011B is offset from the innermost-layer tab portion 1011B in the winding direction of the winding electrode assembly 10; and/or the controller 9 is configured to move the passive roller 3 towards the active roller 2 and increase the heating temperature of the heating assembly 7, when the outermost-layer tab portion 1011B is offset from the innermost-layer tab portion 1011B towards in an opposite direction to the winding direction of the winding electrode assembly 10.

When the outermost-layer tab portion 1011B is offset from the innermost-layer tab portion 1011B in the winding direction of the winding electrode assembly 10, it is indicated that the adjusted thickness of the separator 103 is thinner, and thus the thickness needs to be increased. Therefore, by moving the passive roller 3 away from the active roller 2, the pressures applied to the separator 103 by the active roller 2 and the passive roller 3 can be reduced. Further, the heating temperature of the heating assembly 7 is reduced, to increase the difficulty of thinning the separator 103. In this way, the thickness of the separator 103 can be increased. Therefore, it is possible to align all the tab portions 1011B of the same tab 10D by adjusting the thickness of the separator 103.

When the outermost-layer tab portion 1011B is offset from the innermost-layer tab portion 1011B in the opposite direction to the winding direction of the winding electrode assembly 10, it is indicated that the adjusted thickness of the separator 103 is still thick, and thus the thickness needs to be further reduced. Therefore, by moving the passive roller 3 towards the active roller 2, the pressures applied to the separator 103 by the active roller 2 and the passive roller 3 can be increased. Further, the heating temperature of the heating assembly 7 is increased, to thin the separator 103 easily. In this way, the thickness of the separator 103 can be reduced. Therefore, it is possible to align all the tab portions 1011B of the same tab 10D by adjusting the thickness of the separator 103.

For example, after determining the adjustment direction of the passive roller 3 and the change trend of the heating temperature of the heating assembly 7, the adjustment amount of the passive roller 3 can be changed based on a first predetermined step, and the heating temperature of the heating assembly 7 can be changed based on a second predetermined step. In this way, it is possible to obtain the adjustment amount of the passive roller 3 and the heating temperature of the heating assembly 7 which minimize the offsets of all the tab portions 1011B of the same tab 10D.

According to the embodiment, the adjustment direction of the passive roller 3 and the change trend of the heating temperature of the heating assembly 7 can be determined based on the offset direction of the outermost-layer tab portion 1011B from the innermost-layer tab portion 1011B. Thus, it is possible to perform a targeted adjustment on the offset of the tab 10D to align the tab 10D.

In some embodiments, as shown in FIG. 9, the mounting base 1 includes two fixing plates 11 spaced apart from each other along the axis of the active roller 2, and a plurality of support rods 12 connected between the two fixing plates 11. The active roller 2 and the passive roller 3 are located between two fixing plates 11. Two ends of the active roller 2 are mounted to the two fixing plates 11, respectively. The first drive component 4 is mounted to the fixing plate 11. Two second drive component 5 are provided, and are mounted to the two fixing plates 11, respectively. Two ends of the passive roller 3 are operatively mounted to output ends of the two second drive components 5.

The two fixing plates 11 are spaced apart from each other in parallel. The plurality of support rods 12 are connected between the two fixing plates 11 to form a frame structure. A hollow region is formed by enclosing the plurality of support rods 12. The active roller 2 and the passive roller 3 are disposed in the hollow region. For example, a cuboid space may be formed by enclosing four support rods 12 to accommodate the active roller 2 and the passive roller 3. In addition, in order to the arrangement of the distance detection component 6, a further support rod 12 may be additionally disposed directly above the passive roller 2. The two guide components 8 may be disposed between two sets of left and right support rods 12 and disposed on the two fixing plates 11, respectively.

The two ends of the passive roller 3 are operatively mounted to the output ends of the two second drive components 5, respectively. In some embodiments, the guide component 8 includes a first guide 81 and a second guide 82. The first guide 81 is disposed at the mounting base 1. The second guide 82 is movably disposed relative to the first guide 81 in the adjustment direction of the passive roller 3. An end of the passive roller 3 is mounted to the second guide 82. An output end of the second drive component 5 is connected to the second guide 82. The second drive component 5 can drive the passive roller 3 to move by driving the second guide 82.

In some embodiments, the first drive component 4 is mounted on only one of the fixing plates 11, for example, on an outer side of the fixing plate 11. As a result, the fixing plate 11 is subjected to a large force to increase strength of the fixing plate 11 on which the first drive component 4 is mounted. For example, the fixing plate 11 includes a first plate 111 and a second plate 112 that are stacked with each other in the thickness direction. The first plate 111 may have the same structure as the other fixing plate 11. The second plate 112 is fixed on outer side of the first plate 111 for mounting the first drive component 4.

According to the embodiment, the mounting base 1 has a spliced frame structure. Thus, the mounting base 1 has simple structure and high strength and stability. Therefore, it is possible to facilitate the mounting of various structural members and provide space for the separator 103 to pass therethrough.

In some embodiments, the gap between the active roller 2 and the passive roller 3 ranges from 0 to 100 μm. The pressure between the active roller 2 and the passive roller 3 ranges from 0 to 10000 Mpa. A linear speed at which the separator 103 moves ranges from 0 to 3000 mm/min. The active roller 2 may have the same diameter as the passive roller 3, and the diameter ranges from 0 to 100 mm. The heating temperature ranges from 0 to 100° C.

Figure 12:
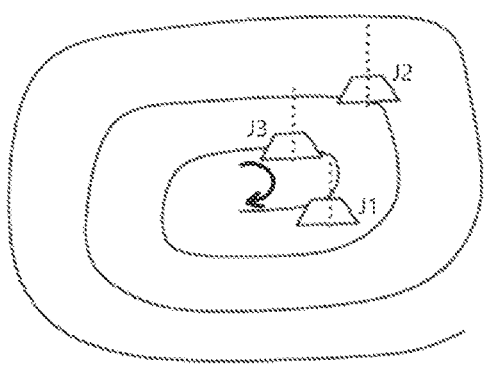
FIG. 12 is a schematic diagram of a winding electrode assembly with a tab offset.

Taking applying a pressure of 500 Mpa to the separator 103 as a reference, a positive offset indicates that the tab 10D is offset in the winding direction, and a negative offset indicates that the tab 10D is offset in an opposite direction to the winding direction. As shown in FIG. 12, it is default that there is no error between a position of the first tab J1 and a position of a first tab in a standard battery. When wound, the second tab J2 is offset in the winding direction, and the third tab J3 is offset in the opposite direction to the winding direction. Due to the offset of the tab 10D, the thickness of the separator 103 needs to be adjusted, and then the first electrode plate 101, the second electrode plate 102, and the adjusted separator 103 are wound to form the electrode assembly 10.

The passive roller 3 is moved away from the active roller 2 to reduce the pressure and lower the temperature of the active roller 2 and the passive roller 3 when the offset is in the winding direction; the passive roller 3 is moved towards the active roller 2 to increase the pressure and rise the temperature of the active roller 2 and the passive roller 3 when the offset is in the opposite direction to the winding, as shown in Table 1.

TABLE 1

| Correspondence between the offset and the temperature of the winding device and the pressure applied in the thickness direction of the separator | | | | |
|---|---|---|---|---|
| Offset mm | −8 | −4 | 0 | 4 | 8 |
| Pressure (MPa) | 50 | 500 | 1000 | 3000 | 8000 |
| Temperature (° C.) | 25 | 50 | 60 | 70 | 85 |

According to the present disclosure, by providing the separator thickness adjustment device 100, the thickness of the separator 103 can be controlled during the winding of the electrode assembly 10, and the effect of ensuring the alignment degree of the tab 10D for any winding electrode assembly 10 is better. In view of this, the thickness of the first electrode plate 101 and/or the second electrode plate 102 can also be adjusted by a similar mechanism, to increase the adjustment range of electrode plates in the thickness direction after combination. Therefore, quality consistency of the electrode assembly 10 formed by the winding process can be improved.

When the electrode assembly 10 is wound by means of the separator adjustment device 100 according to the embodiments of the present disclosure, the following steps may be included: measuring the offset of the tab 10D of electrode assembly; when the offset exceeds product qualification requirement, adjusting the pressures applied to the separator 103 by the active roller 2 and the passive roller 3, and adjusting the heating temperature of the heating assembly 7, to correct the offset of the tab 10D, otherwise no adjusting is made.

Next, embodiments of the present disclosure also provide a separator thickness adjusting method including operations at S110 to S130.

At S110, a separator 103 passes through a gap formed between an active roller 2 and a passive roller 3. The active roller 2 and the passive roller 3 are mounted in parallel to each other.

At S120, The passive roller 3 is driven by a second drive component 5 to move towards or away from the active roller 2, to change pressures applied to two sides of the separator 103 by the active roller 2 and the passive roller 3 through adjusting a size of the gap.

At S130, the active roller 2 is driven by a first drive component 4 to rotate about its own axis to allow a thickness of the separator 103 to be adjusted during the movement of the separator 103.

The operations at S110 to S130 may be performed sequentially. That is, a position of the passive roller 3 is pre-adjusted without unchanged, or the operation at S120 may be performed during the operation at S130. That is, the position of the passive roller 3 may be adjusted on-line during a winding.

According to the embodiment, the second drive component 5 can drive the passive roller 3 to move towards or away from the active roller 2 to change the pressures applied to the two sides of the separator 103 by the active roller 2 and the passive roller 3 through adjusting the size of the gap, thereby adjusting the overall thickness of the separator 103. Thus, during the winding to form the electrode assembly 10, the overall thickness of the separator 103 can be adjusted based on the offset of the tab 10D, to reduce the offset of each of the tab portions 1011B of the tab 10D. Thus, it is possible to improve the alignment degree of each tab portion 1011B of the tab 10D. Since the negative electrode plate may be subjected to expansion force during the production, the thickness and size of the negative electrode plate may fluctuate, and the thickness and surface flatness of the positive electrode plate and the negative electrode plate after coated with the active substance and dried may also fluctuate. Further, a deviation may occur on a winding force applied to the electrode assembly 10 during the winding. All of these may cause the offset of the tab 10D. By forming the separator 103 with the constant thickness and then adjusting the thickness of the separator 103, it is possible to achieve the adjustment as required.

Further, the separator 103 has good flexibility and ductility and a large adjustment range, and is thus not easy to be damaged or fractured during the thickness adjustment. As a result, the adjusted separator has a uniform thickness, which can ensure the winding quality and yield of the electrode assembly 10. In addition, through driving the separator 103 by the first drive component 4 to operate, the thickness of the separator 103 can be adjusted in the entire extending direction to adjust the thickness of the separator 103 on-line during the winding of the electrode assembly 10. Thus, the production efficiency of the electrode assembly 10 can be improved.

In some embodiments, the separator thickness adjusting method according to the embodiments of the present disclosure further includes: heating at least one of the active roller 2 and passive roller 3 by the heating assembly 7 during the applying of the pressures to the two sides of the separator 103 by the active roller 2 and passive roller 3.

According to the embodiment, by providing the heating component 7 to heat at least one of the active roller 2 and the passive roller 3, the temperature of the separator 103 can be increased during the applying of the pressures to the separator 103 by the active roller 2 and the passive roller 3. Thus, it is possible to thin the separator 103 easily with the pressures and reduce the pressures applied by the active roller 2 and the passive roller 3. As a result, dot-shaped particles distributed in a PCS layer can be flatted easily to thin the separator 103, thereby increasing the thickness adjustment range of the separator 103.

In some embodiments, the separator thickness adjusting method of the present disclosure further includes: determining the adjustment amount of the passive roller 3 and the heating temperature of the heating assembly 7 based on an offset of an innermost-layer tab portion 1011B from an outermost-layer tab portion 1011B of a winding electrode assembly in a winding circumferential direction of the winding electrode assembly 10.

This step may be performed before the operation at S120.

According to the embodiment, the adjustment amount of the passive roller 3 and the heating temperature of the heating assembly 7 can be quantitatively determined based on the offset of the tab 10D in the winding circumferential direction of the electrode assembly 10. Thus, the alignment degree of the tab 10D can be improved.

In some embodiments, determining the adjustment amount of the passive roller 3 and the heating temperature of the heating assembly 7 based on an offset of an innermost-layer tab portion 1011B from an outermost-layer tab portion 1011B of a winding electrode assembly in a winding circumferential direction of the winding electrode assembly 10 includes: moving the passive roller 3 away from the active roller 2 and reducing the heating temperature of the heating assembly 7, when the outermost-layer tab portion 1011B is offset from the innermost-layer tab portion 1011B in a winding direction of the winding electrode assembly 10; and/or moving the passive roller 3 towards the active roller 2 and increasing the heating temperature of the heating assembly 7, when the outermost-layer tab portion 1011B is offset from the innermost-layer tab portion 1011B in an opposite direction to the winding direction of the winding electrode assembly 10.

According to the embodiment, an adjustment direction of the passive roller 3 and a change trend of the heating temperature of the heating assembly 7 can be determined based on the offset direction of the outermost-layer tab portion 1011B from the innermost-layer tab portion 1011B. Thus, it is possible to perform a targeted adjustment on the offset of the tab 10D to align the tab 10D.

In some embodiments, the controller 9 as described above may be a general-purpose processor, a programmable logic controller (PLC), a digital signal processor (DSP), an application specific integrated circuit (ASIC), a field-programmable gate array (FPGA) or other programmable logic devices, discrete gate or transistor logic devices, discrete hardware assemblies, or any suitable combination thereof.

While the present disclosure has been described with reference to preferred embodiments, various modifications may be made and equivalents may be substituted for components thereof without departing from the scope of the present disclosure. In particular, the technical features mentioned in the various embodiments can be combined in any manner as long as there is no structural conflict. The present disclosure is not limited to the particular embodiments disclosed herein, and includes all embodiments falling within the scope of the claims.

What is claimed is:

1. A separator thickness adjustment device, comprising:
   a mounting base;
   an active roller and a passive roller disposed at the mounting base in parallel to each other, each of the active roller and the passive roller being rotatable about its own axis, a gap being formed between the active roller and the passive roller, a separator passing through the gap, and a position of the passive roller relative to the active roller being adjustable to change a size of the gap;
   a first drive component configured to drive the active roller to rotate about its own axis to move the separator;
   a second drive component configured to drive the passive roller to move towards or away from the active roller, to change pressures applied to two sides of the separator by the active roller and the passive roller through adjusting the size of the gap, adjusting a thickness of the separator during the movement of the separator;
   a heating assembly configured to heat at least one of the active roller and the passive roller; and
   a controller configured to determine an adjustment amount of the passive roller and a heating temperature of the heating assembly based on an offset of an innermost-layer tab portion from an outermost-layer tab portion of a winding electrode assembly in a winding circumferential direction of the winding electrode assembly.

2. The separator thickness adjustment device according to claim 1, further comprising a distance detection component disposed at the mounting base and configured to detect a movement distance of the passive roller.

3. The separator thickness adjustment device according to claim 1, wherein the active roller and the passive roller are disposed directly opposite to each other on the two sides of the separator.

4. The separator thickness adjustment device according to claim 1, further comprising two guide components disposed between two ends of the passive roller and the mounting base respectively and configured to guide the movement of the passive roller.

5. The separator thickness adjustment device according to claim 4, wherein each of the guide components comprises:
   a first guide disposed at the mounting base; and
   a second guide movably disposed relative to the first guide in an adjustment direction of the passive roller, wherein:
   an end of the passive roller is rotatably mounted to the second guide; and
   an output end of the second drive component is connected to the second guide.

6. The separator thickness adjustment device according to claim 1, wherein the heating assembly comprises:
   a first heating component disposed within the active roller and configured to heat the active roller; and/or
   a second heating component disposed within the passive roller and configured to heat the passive roller.

7. The separator thickness adjustment device according to claim 1, further comprising a controller, wherein:
   the controller is configured to move the passive roller away from the active roller and reduce the heating temperature of the heating assembly, when the outermost-layer tab portion is offset from the innermost-layer tab portion in a winding direction of the winding electrode assembly; and/or
   the controller is further configured to move the passive roller towards the active roller and increase the heating temperature of the heating assembly, when the outermost-layer tab portion is offset from the innermost-layer tab portion in an opposite direction to the winding direction of the winding electrode assembly.

8. The separator thickness adjustment device according to claim 1, wherein:
   the mounting base comprises:
   two fixing plates spaced apart from each other along the axis of the active roller; and
   a plurality of support rods connected between the two fixing plates; and
   the active roller and the passive roller are located between the two fixing plates (11);
   two ends of the active roller are mounted to the two the fixing plates, respectively;
   the first drive component is mounted to the fixing plate;
   two second drive components are provided, and mounted to the two the fixing plates (11), respectively; and
   two ends of the passive roller are operatively mounted to output ends of the two second drive components, respectively.

9. The separator thickness adjustment device according to claim 5, wherein a guide groove is formed on the first guide, the guide groove extends in the adjustment direction of the passive roller, the second guide comprises a base plate and a bump connected to the base plate, the bump is embedded in the guide groove and is movable along the guide groove.

10. The separator thickness adjustment device according to claim 9, wherein the base plate is supported on the first guide, The end of the passive roller is connected to the bump, the passive roller is rotatably connected relative to the bump.

11. The separator thickness adjustment device according to claim 10, wherein the end of the passive roller is rotatably mounted to the bump by a bearing.

12. The separator thickness adjustment device according to claim 10, wherein the passive roller comprises a shaft and a sleeve, an end of the shaft is fixedly mounted to the bump, and the sleeve is rotatably sleeved over the shaft.

13. The separator thickness adjustment device according to claim 12, wherein the first guide has an inverse structure to the second guide.

14. The separator thickness adjustment device according to claim 6, wherein the first heating component is disposed in an entire length direction of the active roller, and the second heating component is disposed in an entire length direction of the passive roller, the heating temperatures of the first heating component and the second heating component are linkage-controlled to allow the active roller and the passive roller to reach the same temperature.

15. The separator thickness adjustment device according to claim 1, wherein the heating assembly comprises at least one liquid conduit disposed in the active roller and/or the passive roller for introducing a heated gas or heated liquid medium for heating the active roller and/or the passive roller.

16. A winding electrode assembly production system, comprising:

an unwinding device configured to unwind a separator of a winding form;

a winding device configured to wind a first electrode plate, a second electrode plate, and the separator to form an electrode assembly, the first electrode plate having an opposite polarity to the second electrode plate; and the separator thickness adjustment device according to claim 1, the separator thickness adjustment device being disposed between the unwinding device and the winding device and configured to adjust a thickness of the separator unwound from the unwinding device.

* * * * *